(12) United States Patent
Seregin et al.

(10) Patent No.: US 9,338,451 B2
(45) Date of Patent: May 10, 2016

(54) COMMON SPATIAL CANDIDATE BLOCKS FOR PARALLEL MOTION ESTIMATION

(71) Applicant: QUALCOMM Incorporated, San Diego, CA (US)

(72) Inventors: Vadim Seregin, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 13/861,302

(22) Filed: Apr. 11, 2013

(65) Prior Publication Data

US 2013/0272413 A1    Oct. 17, 2013

Related U.S. Application Data

(60) Provisional application No. 61/623,518, filed on Apr. 12, 2012.

(51) Int. Cl.
| | |
|---|---|
| *H04N 11/02* | (2006.01) |
| *H04N 19/51* | (2014.01) |
| *H04N 19/52* | (2014.01) |
| *H04N 19/463* | (2014.01) |
| *H04N 19/174* | (2014.01) |
| *H04N 19/43* | (2014.01) |
| *H04N 19/436* | (2014.01) |
| *H04N 19/56* | (2014.01) |

(52) U.S. Cl.
CPC ....... *H04N 19/00587* (2013.01); *H04N 19/174* (2014.11); *H04N 19/43* (2014.11); *H04N 19/436* (2014.11); *H04N 19/463* (2014.11); *H04N 19/51* (2014.11); *H04N 19/52* (2014.11); *H04N 19/56* (2014.11)

(58) Field of Classification Search
None
See application file for complete search history.

(56) References Cited

U.S. PATENT DOCUMENTS

| 8,229,174 B2 | 7/2012 | Kokaram |
| 2012/0076207 A1 | 3/2012 | Schmit et al. |

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Christopher S Kelley
*Assistant Examiner* — Kaitlin A Retallick
(74) *Attorney, Agent, or Firm* — Shumaker & Sieffert, P.A.

(57) ABSTRACT

In one example, an apparatus for coding video data comprises a video coder configured to, for a parallel motion estimation (PME) region comprising a plurality of blocks of video data within the PME region, identify a common set of spatial candidate blocks outside of and adjacent to the PME region, each of the common set of spatial candidate blocks at a respective, predefined location relative to the PME region and, for each of the blocks within the PME region for which motion information prediction is performed, generate a respective motion information candidate list, wherein, for at least some of the blocks within the PME region for which motion information prediction is performed, generating the motion information candidate list comprises evaluating motion information of at least one of the common set of spatial candidate blocks for inclusion in the motion information candidate list for the block.

34 Claims, 9 Drawing Sheets

(56) References Cited

U.S. PATENT DOCUMENTS

| | | | |
|---|---|---|---|
| 2012/0189049 A1 | 7/2012 | Coban et al. | |
| 2012/0257678 A1* | 10/2012 | Zhou | H04N 19/436 375/240 |
| 2012/0320968 A1 | 12/2012 | Zheng et al. | |
| 2013/0003851 A1 | 1/2013 | Yu et al. | |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability—PCT/US2013/036394, The International Bureau of WIPO—Geneva, Switzerland, Jul. 10, 2014, 11 pp.

International Search Report and Written Opinion—PCT/US2013/036394—ISA/EPO—Aug. 22, 2013, 16 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jeon, et al., "AHG10: Unified design on parallel merge/skip", JCT-VC Meeting; MPEG Meeting; Jan. 2, 2012-Oct. 2, 2012, San Jose, (Joint Colloborative Team on Video Coding of ISO/IEC JTC1/SC29/WG11 and ITU-T SG.16 ); <URL: http://wftp3.1tu.int/av-arch/jctvc-site/>, No. JCTVC-H0090, XP030111117, 10 pp.

Jeon, et al., "Non-CE9: Improvement on Parallelized Merge/Skip Mode", JCT-VC Meeting; MPEG Meeting; Nov. 21, 2011-Nov. 30, 2011; Geneva; (Joint Colloborative Team on Video Coding of ISO/IEC JTC1/SC29/WG11 and ITU-T SG.16); URL: http://eftp3.itu.int/av-arch/jctvc-site/,, No. JCTVC-G164, XP030110148, 7 pp.

Kim, et al., "AHG10: Unified design on parallel merge/skip with reduced candidates", JCT-VC Meeting; MPEG Meeting; Jan. 2, 2012-Oct. 2, 2012; San Jose; (Joint Collaborative Team on Video Coding of ISO/IEC JTC1/SC29/WG11 and ITU-T SG.16 ); <URL: http://wftp3.1tu.int/av-arch/jctvc-site/, No. JCTVC-H0247, XP030111274, 7 pp.

Kim, et al., "CU-based Merge Candidate List Construction," Document: JCTVC-G416, Joint Collaborative Team on Video Coding (JCT-VC) of ITU-T SG16 WP3 and ISO/IEC JTC1/SC29/WG11, 7th Meeting: Geneva, No. JCTVCG416, XP030110400, 13 pp. (Nov. 21-30, 2011).

Kim, et al., "Non-CE9: Throughput improvement for merge/skip mode", JCT-VC Meeting; MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.1tu.int/av-arch/jctvc-site/,, No. JCTVC-H0240, XP030111267, 5 pp.

Qin et al: "Parallel AMVP candidate list construction for HEVC", Visual Communications and Image Processing (VCIP), 2012 IEEE, IEEE, Nov. 27, 2012, 7 pp. XP032309189, DOI:10.1109/VCIP.2012.6410775 ISBN: 978-1-4673-4405-0.

Wen, et al., "Parallel Merge/skip Mode for HEVC", MPEG Meeting; Nov. 28, 2011-Dec. 2, 2011; Geneva; (Motion Picture Expert Group or ISO/IECJTC1/SC29/WG11), No. m21949, XP030050512, 13 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Yu, et al.,"Parallel AMVP candidate list construction", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0036, XP030111799, 7 pp.

Yu, et al., "Non-CE9: The Parallel Friendly MVP Candidate Calculation for HEVC", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); No. JCTVC-G710, XP030110694, 4 pp.

Zhou, et al., "Parallelized merge/skip mode for HEVC", JCT-VC Meeting, MPEG Meeting; Jul. 14, 2011-Jul. 22, 2011; Torino; (Joint Collaborative Team on Video Coding of ISO/IEC JTC1/SC29/WG11 and ITU-T SG.16 ); <URL: http://wftp3.itu.int/av-arch/jctvc-site/,, No. JCTVC-F069, XP030009092, 13 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/036394, dated Apr. 17, 2014, 9 pp.

* cited by examiner

COMMON SPATIAL CANDIDATE BLOCKS FOR PARALLEL MOTION ESTIMATION

This application claims the benefit of U.S. Provisional Application Ser. No. 61/623,518, filed Apr. 12, 2012, the entire content of which is incorporated herein by reference.

TECHNICAL FIELD

This disclosure relates to video coding and, more particularly, to motion information (e.g., motion vector) prediction for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit and receive digital video information more efficiently. Other video compression techniques are described in the High efficiency video coding (HEVC) standard which is currently under development. The video devices may transmit, receive, encode, decode, and/or store digital video information more efficiently by implementing such video coding techniques.

Video compression techniques include spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for constructing motion information candidate lists for blocks of video data within a parallel motion estimation (PME) region for motion information prediction, e.g., motion vector prediction (MVP) for a merge mode or advanced motion vector prediction (AMVP) mode, as examples. In general, to construct a motion information candidate list for a video block, a video coder evaluates the respective motion information of a set of local spatial candidate blocks neighboring the video block, as well as one or more temporal motion information candidates from video blocks in different pictures, for inclusion in the motion information candidate list. However, the respective motion information candidate lists for video blocks within a PME region may be constructed in parallel. Accordingly, for at least some of the video blocks within a PME, at least some of the local spatial candidate blocks neighboring the video block are within the PME, and thus their motion information may not be available for evaluation. Checking local spatial candidates for each video block within a PME region to determine whether the local spatial candidates are within or outside of the PME region may increase the complexity of motion information prediction for blocks within a PME region. Furthermore, when the number and locations of available local spatial candidates vary from video block to video block within a PME region, construction of and signaling an index for motion information candidate lists may be more complex.

According to the techniques of this disclosure, a video coder identifies a common set of spatial candidate blocks for a PME region that are outside of and adjacent to the PME region. The common set of spatial candidate blocks are common to all of the video blocks within the PME region for which motion information prediction is performed, and may be different than any of the respective sets of local spatial candidate blocks for video blocks within the PME region. In some examples, the relationship of the locations of the common set of spatial candidate blocks relative to the PME region is the same as the relationship of local spatial candidate blocks to their respective video block, e.g., left, above, above and right, below and left, and above and left.

According to the techniques of this disclosure, for at least some of the blocks within a PME region, a video coder may evaluate motion information of at least one of the common set of spatial candidate blocks for inclusion in the motion information candidate list for the block. In some examples, a video coder may evaluate all of the common set of spatial candidate blocks, and no local spatial candidate blocks, for each video block within the PME region for which motion information prediction is performed. In such examples, the video coder may additionally evaluate a respective temporal motion information candidate for each of the video blocks within the PME region for which motion information prediction is performed, or may evaluate a common temporal motion information candidate for all of the blocks for which motion information prediction is performed. In the latter case, the motion information candidate list may be the same for all of the video blocks within the PME region for which motion information prediction is performed.

In other examples, a video coder may, for each video block in the PME region for which motion information prediction is performed, evaluate the motion information of all of the common set of spatial candidate blocks in addition to any local spatial candidate blocks that are outside of the PME region. In other examples, a video coder may, for a given video block within a PME region, identify one or more local spatial candidate blocks within the PME region, and selectively evaluate the one or more of the common set of spatial candidate blocks whose locations relative to the PME region are the same as the locations of the one or more local spatial candidate blocks relative to the video block. These and other example techniques according to this disclosure may reduce complexity of motion information prediction for blocks within a PME.

In one example, a method for decoding video data comprises identifying a common set of spatial candidate blocks outside of and adjacent to a parallel motion estimation (PME) region comprising a plurality of blocks of video data, each of the common set of spatial candidate blocks at a respective, predefined location relative to the PME region. The method further comprises generating a respective motion information candidate list for each of the blocks within the PME region for which motion information prediction is performed, wherein, for at least some of the blocks within the PME region for which motion information prediction is performed, generating the motion information candidate list comprises evaluating motion information of at least one of the common set of spatial candidate blocks for inclusion in the motion information candidate list for the block. The method further comprises decoding the blocks of video data within the PME region for which motion information prediction is performed based on the respective motion information candidate lists.

In another example, a method for encoding video data comprises identifying a common set of spatial candidate blocks outside of and adjacent to a parallel motion estimation (PME) region comprising a plurality of blocks of video data, each of the common set of spatial candidate blocks at a respective, predefined location relative to the PME region. The method further comprises generating a respective motion information candidate list for each of the blocks within the PME region for which motion information prediction is performed, wherein, for at least some of the blocks within the PME region for which motion information prediction is performed, generating the motion information candidate list comprises evaluating motion information of at least one of the common set of spatial candidate blocks for inclusion in the motion information candidate list for the block. The method further comprises encoding the blocks of video data within the PME region for which motion information prediction is performed based on the respective motion information candidate lists.

In another example, an apparatus for coding video data comprise a video coder configured to identify a common set of spatial candidate blocks outside of and adjacent to a parallel motion estimation (PME) region comprising a plurality of blocks of video data, each of the common set of spatial candidate blocks at a respective, predefined location relative to the PME region. The video coder is further configured to generate a respective motion information candidate list for each of the blocks within the PME region for which motion information prediction is performed, wherein, for at least some of the blocks within the PME region for which motion information prediction is performed, to generate the motion information candidate list for the block the video coder evaluates motion information of at least one of the common set of spatial candidate blocks for inclusion in the motion information candidate list for the block. The video coder is further configured to code the blocks of video data within the PME region for which motion information prediction is performed based on the respective motion information candidate lists.

In another example, an apparatus for coding video data comprises means for identifying a common set of spatial candidate blocks outside of and adjacent to a parallel motion estimation (PME) region comprising a plurality of blocks of video data, each of the common set of spatial candidate blocks at a respective, predefined location relative to the PME region. The apparatus further comprises means for generating a respective motion information candidate list for each of the blocks within the PME region for which motion information prediction is performed, wherein, means for generating the motion information candidate list comprises means for evaluating, for at least some of the blocks within the PME region for which motion information prediction is performed, motion information of at least one of the common set of spatial candidate blocks for inclusion in the motion information candidate list for the block. The apparatus further comprises means for coding the blocks of video data within the PME region for which motion information prediction is performed based on the respective motion information candidate lists.

In another example, a computer program product comprises a computer-readable storage medium having stored thereon instructions. When executed, the instructions cause one or more processors of an apparatus for coding video data to identify a common set of spatial candidate blocks outside of and adjacent to a parallel motion estimation (PME) region comprising a plurality of blocks of video data, each of the common set of spatial candidate blocks at a respective, predefined location relative to the PME region. The instructions further cause the one or more processors to generate a respective motion information candidate list for each of the blocks within the PME region for which motion information prediction is performed, wherein, for at least some of the blocks within the PME region for which motion information prediction is performed, the instructions that cause the one or more processors to generate the motion information candidate list comprise instructions that cause the one or more processors to evaluate motion information of at least one of the common set of spatial candidate blocks for inclusion in the motion information candidate list for the block. The instructions further cause the one or more processors to code the blocks of video data within the PME region for which motion information prediction is performed based on the respective motion information candidate lists.

The details of one or more examples are set forth in the accompanying drawings and the description below. Other features, objects, and advantages will be apparent from the description and drawings, and from the claims.

DETAILED DESCRIPTION

Figure 1:
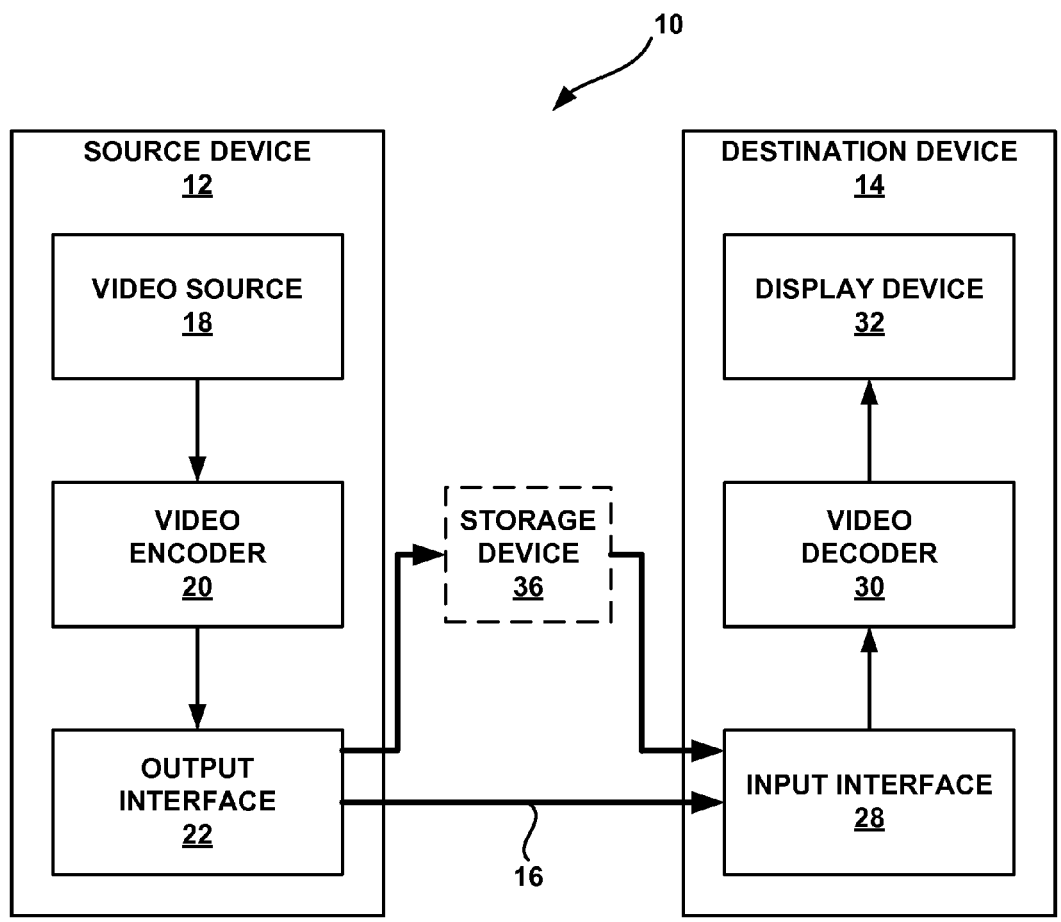
FIG. 1 is a block diagram illustrating an example video encoding and decoding system that may utilize the techniques described in this disclosure.

As discussed above, video compression techniques include temporal (inter-picture) prediction of blocks of video data, i.e., video blocks, relative to reference samples in another block in another picture. An inter-coded block is coded according to motion information, e.g., a motion vector that points to a block of reference samples forming the predictive block in the other picture. In addition to a motion vector, motion information may also include, for example, a reference index. In some examples, to achieve further bitstream efficiency, the motion information e.g., motion vector, for a video block may itself be predicted using motion information prediction techniques, e.g., motion vector prediction (MVP) techniques.

According to such motion information prediction techniques, a video coder may derive the motion vector and/or other motion information for a current video block from a reference block. The reference blocks from which the motion information may be derived generally include a plurality of pre-defined spatially-neighboring blocks, and one or more co-located or neighboring blocks from another picture. A video coder, e.g., a video encoder or video decoder, may construct a motion information candidate list including spatial and temporal candidates based on the motion information of these reference blocks, which may be referred to as local motion information candidate blocks. The video coder may encode or decode an index into the candidate list to identify the selected motion information candidate for coding the video block. The motion information prediction techniques may include, as examples, a merge mode and an advance motion vector prediction (AMVP) mode.

In order to further improve coding efficiency and speed, it has been proposed that various aspects of the video coding process, e.g., motion estimation, motion compensation, transformation, quantization, and entropy coding, may be performed for a plurality of video blocks by a video coder in parallel. In order to facilitate such parallelization, a video coder may include a plurality of parallel processing units, which may be separate hardware and/or software units, which may perform such coding stages in a pipeline fashion, e.g., by processing a plurality of blocks concurrently at each stage using the plurality of parallel processing units.

It has been proposed that motion estimation may be parallelized in this manner. In particular, a video coder may specify a parallel motion estimation (PME) region that includes a plurality of video blocks therein. The video coder may then perform motion estimation and/or motion compensation using motion information for the plurality of blocks within the PME region in parallel.

Efforts are currently in progress to develop a new video coding standard, currently referred to as High Efficiency Video Coding (HEVC). The upcoming standard is also referred to as H.265. The HEVC standard may also be referred to as ISO/IEC 23008-HEVC, which is intended to be the standard number for the delivered version of HEVC. The standardization efforts are based on a model of a video coding device referred to as the HEVC Test Model (HM). The HM presumes several capabilities of video coding devices over devices according to, previous coding standards, such as ITU-T H.264/AVC. For example, whereas H.264 provides nine intra-prediction encoding modes, HM provides as many as thirty-five intra-prediction encoding modes.

A recent working Draft (WD) of HEVC, referred to as "HEVC Working Draft 6" or "WD6," is described in document JCTVC-H1003, Bross et al., "High-Efficiency Video Coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February 2012, which is incorporated herein by reference in its entirety, and which as of Oct. 1, 2012, is downloadable from: http://phenix.int-evry.fr/jct/doc_end_user/documents/8_San%20Jose/wg11/JCTVC-H1003-v22.zip Further, another recent working draft of HEVC, Working Draft 8, referred to as "HEVC Working Draft 8" or "WD8," is described in document HCTVC-J1003_d7, Bross et al., "High Efficiency Video Coding (HEVC) Text Specification draft 8," JCT-VC of ITU-T SG16 WP3 and ISO/IEC JTC1/SC29/WG11, 10th Meeting: Stockholm, Sweden, July, 2012, which is incorporated herein by reference in its entirety, and which as of Oct. 1, 2012, is downloadable from: http://phenix.int-evry.fr/jct/doc_end_user/documents/10_Stockholm/wg11/JCTVC-J1003-v8.zip.

The HEVC standard continues to evolve, and a newer draft of the standard referred to as "HEVC Working Draft 10," or "WD10," is described in document JCTVC-L1003_v18, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, 14-23 Jan. 2013, which, as of Mar. 11, 2013, is downloadable from http://phenix.it-sudparis.eu/jct/doc_end_user/documents/12_Geneva/wg11/JCTVC-L1003-v18.zip. The entire content of WD10 is hereby incorporated by reference.

In the test model (HM) for HEVC, a PME region is signaled within a picture parameter set (PPS). In general, to construct a motion information candidate list for a video block, a video coder evaluates the respective motion information of a set of local spatial candidate blocks neighboring the video block, as well as a temporal motion information candidate from a video block in a different picture, for inclusion in the motion information candidate list. However, the respective motion information candidate lists for video blocks within a PME region may be constructed in parallel. Accordingly, for at least some of the video blocks within a PME region, at least some of the local spatial candidate blocks neighboring the video block are within the PME region, and thus their motion information will not be available for evaluation.

According to proposals for the HEVC standard, any spatial motion information candidates located inside a PME region are marked as unavailable for candidate list construction. Only spatial motion information candidates located outside of a current PME region can be evaluated for candidate list construction. Checking local spatial candidates for each video block within a PME for which motion information prediction is performed to determine whether the local spatial candidates are within or outside of the PME may increase the complexity of motion information prediction for blocks within a PME. Furthermore, when the number and locations of available local spatial candidates vary from video block to video block within a PME region, construction of and signaling an index for motion information candidate lists may be more complex.

In general, this disclosure describes techniques for constructing motion information candidate lists for blocks of video data within a PME region for motion information prediction, e.g., motion vector prediction (MVP) for a merge mode or AMVP mode, as examples. In proposals for the HEVC, PME may be applied when performing motion information prediction according to the merge mode. Accordingly, the techniques of this disclosure may be applied when performing motion information prediction according to the merge mode within a PME region. Additionally or alternatively, however, the techniques of this disclosure may be applied when performing motion information prediction according to the AMVP mode, or any other motion information prediction mode, within a PME region. Additionally, the techniques of this disclosure are not limited to applicability in the context of coding video data according to the HEVC standard, but may be applicable in other contexts, including coding of video data according to other video coding standards, e.g., such as those identified herein.

According to the techniques of this disclosure, a video coder identifies a common set of spatial candidate blocks for a PME region that are outside of and adjacent to the PME region. The common set of spatial candidate blocks are common to all of the video blocks within the PME region, and may be different than any of the respective sets of local spatial candidate blocks for video blocks within the PME region for which motion information prediction is performed. In some examples, the relationship of the locations of the common set of spatial candidate blocks relative to the PME region is the same as the relationship of local spatial candidate blocks to their respective video block, e.g., left, above, above and right, below and left, and above and left. According to the techniques of this disclosure, for at least some of the blocks within a PME region, a video coder may evaluate motion information of at least one of the common set of spatial candidate blocks for inclusion in the motion information candidate list for the block. The example techniques according to this disclosure may reduce complexity of motion information prediction for blocks within a PME.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 36. Similarly, encoded data may be accessed from storage device 36 by input interface 28 of destination device 14. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 36 may correspond to a file server or another intermediate storage device that may hold the encoded video generated by source device 12. Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 36 for later access by destination device 14 or other devices, for decoding and/or playback.

Destination device 14 includes an input interface 28, a video decoder 30, and a display device 32. In some cases, input interface 28 may include a receiver and/or a modem.

Input interface 28 of destination device 14 may receive the encoded video data over link 16. The encoded video data communicated over link 16, or provided on storage device 36, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use in inter-picture prediction.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30.

For further efficiency of inter-picture prediction, video encoder 20 and video decoder 30 may implement techniques for motion information prediction, e.g., motion vector prediction (MVP). Modes of motion information prediction supported by the HM include merge mode and AMVP.

Merge mode refers to one or more video coding modes in which motion information, such as motion vectors, reference frame indexes, prediction directions, or other information, for a current video block to be coded is inherited from a spatially-neighboring video block in the same picture as the current video block, or a co-located or neighboring video block in a (temporally) different picture. The spatially neighboring blocks in the same picture may be referred to as local spatial candidate blocks. The co-located or neighboring blocks in a different picture may be referred to as temporal candidate blocks.

To implement merge mode, video encoder 20 and video decoder 30 both implement a common, pre-defined process to evaluate the motion information of the candidate blocks, and construct a motion information candidate list from such motion information. An index value, signaled from video encoder 20 to video decoder 30, may be used to identify which candidate in the candidate list is used to code the video block, and thus from which candidate block the current video block inherits its motion information (e.g., a top, top right, left, left bottom block, relative to the current block, or from a temporally adjacent frame).

Skip mode may comprise one type of merge mode (or a mode similar to merge mode). With skip mode, motion information is inherited, but no residual information is coded. Residual information generally refers to pixel difference information indicating pixel differences between an original, unencoded version of the block to be coded and a predictive block identified by the motion information inherited from the spatially neighboring block or co-located block. Direct mode may be another type of merge mode (or mode similar to merge mode). Direct mode may be similar to skip mode in that motion information is inherited, but with direct mode, a video block is coded to include residual information. The phrase "merge mode" is used herein to refer to any one of these modes, which may be called skip mode, direct mode or merge mode.

AMVP mode is similar to merge mode in that video encoder 20 and video decoder 30 implement a common, pre-defined process to evaluate the motion information local candidate blocks and one or more temporal candidate blocks, and construct a motion information candidate list for a video block based on the evaluated motion information. However, the pre-defined list construction process for AMVP is different than that for merge mode. Additionally, for AMVP, the video block does not inherit all of the candidate motion information. Rather, in AMVP, the video block inherits the motion vector from the selected candidate block, which is signaled from the video encoder 20 to video decoder 30 by an index into the motion information candidate list. In AMVP, the video encoder 20 signals other motion information, such as a reference picture index and prediction direction, to the video decoder 30. For AMVP, the video coder additionally signals motion vector differences, where the motion vector difference is a difference between the motion vector predictor identified by the index and an actual motion vector used to predict a current block. Thus, AMVP may provide greater video coding fidelity for the video block, by explicitly signaling more motion information for the video block, at the cost of reduced bit stream efficiency relative to merge mode.

Current versions of HEVC implement parallel motion estimation (PME) to improve parallel processing. A video encoder, e.g., video encoder 20, may specify a PME region comprising a plurality of video blocks, e.g., PUs, within a picture. The video encoder may signal the PME region to a video decoder, e.g., video decoder 30, as part of a picture header or elsewhere in a coded bitstream. When implementing PME, a video coder, e.g., video encoder 20 and/or video decoder 30, determines motion information for a plurality of PUs within a PME region in parallel.

However, for at least some of the video blocks within a PME region for which motion information prediction is performed, at least some of the local spatial candidate blocks neighboring the video block are within the PME region, and thus their motion information will not be available for evaluation. According to some proposals considered for inclusion in the HEVC standard, any spatial motion information candidates located inside a PME region are marked as unavailable for candidate list construction. Only spatial motion information candidates located outside of a current PME region can be evaluated for candidate list construction.

According to the techniques of this disclosure, a video coder, e.g. video encoder 20 and/or video decoder 30, identifies a common set of spatial candidate blocks for a PME region that are outside of and adjacent to the PME region. The common set of spatial candidate blocks are common to all of the video blocks within the PME region, and may be different than any of the respective sets of local spatial candidate blocks for video blocks within the PME region for which motion information prediction is performed. In some examples, the relationship of the locations of the common set of spatial candidate blocks relative to the PME region is the same as the relationship of local spatial candidate blocks to their respective video block, e.g., left, above, above-right, below-left, and above-left.

For at least some of the blocks within a PME region, a video coder, e.g., video encoder 20 and/or video decoder 30, may evaluate motion information, e.g., motion vectors and/or reference indices, of at least one of the common set of spatial candidate blocks for inclusion in the motion information candidate list for the block. In some examples, the video encoder and video decoder may evaluate all of the common set of spatial candidate blocks, and no local spatial candidate blocks, for each video block within the PME region for which motion information prediction is performed. In such examples, the video coder may additionally evaluate a respective temporal motion information candidate for each of the video blocks within the PME region for which motion information prediction is performed, or may evaluate a common temporal motion information candidate for all of the blocks. In the latter case, the motion information candidate list may be the same for all of the video blocks within the PME region for which motion information prediction is performed.

In other examples, video encoder 20 and/or video decoder 30 may, for each video block in the PME region for which motion information prediction is performed, evaluate the motion information of all of the common set of spatial candidate blocks in addition to any local spatial candidate blocks that are outside of the PME region. In other examples, a video coder may, for a given video block within a PME region, identify one or more local spatial candidate blocks within the PME region, and thus not available. In such examples, video encoder 20 and/or video decoder 30 selectively evaluates the one or more of the common set of spatial candidate blocks whose locations relative to the PME region can be the same as the locations of the one or more local spatial candidate blocks relative to the video block. Video encoder 20 and/or video decoder 30 may then construct a motion information candidate list for the video block including one or more common spatial candidates and/or one or more local spatial candidates.

Accordingly, video encoder 20 is an example of a video encoder configured, according to the techniques of this disclosure to, for a PME region comprising a plurality of blocks of video data within the PME region, identify a common set of spatial candidate blocks outside of and adjacent the PME region, each of the common set of spatial candidate blocks at a respective, predefined location relative to the PME region and, for each of the blocks within the PME region for which motion information prediction is performed, generate a respective motion information candidate list, wherein, for at least some of the blocks within the PME region for which motion information prediction is performed, to generate the motion information candidate list the video coder is configured to evaluate motion information of at least one of the common set of spatial candidate blocks for inclusion in the motion information candidate list for the block. Video encoder 20 is further configured, according to the techniques of this disclosure, to encode the blocks of video data within the PME region for which motion information prediction is performed based on the respective motion information candidate lists.

Additionally, video decoder 30 is an example of a video decoder configured, according to the techniques of this disclosure to, for a PME region comprising a plurality of blocks of video data within the PME region, identify a common set of spatial candidate blocks outside of and adjacent the PME region, each of the common set of spatial candidate blocks at a respective, predefined location relative to the PME region and, for each of the blocks within the PME region for which motion information prediction is performed, generate a respective motion information candidate list, wherein, for at least some of the blocks within the PME region for which motion information prediction is performed, to generate the motion information candidate list the video coder is configured to evaluate motion information of at least one of the common set of spatial candidate blocks for inclusion in the motion information candidate list for the block. Video encoder 20 is further configured, according to the techniques of this disclosure, to decode the blocks of video data within the PME region for which motion information prediction is performed based on the respective motion information candidate lists.

Figure 2A:
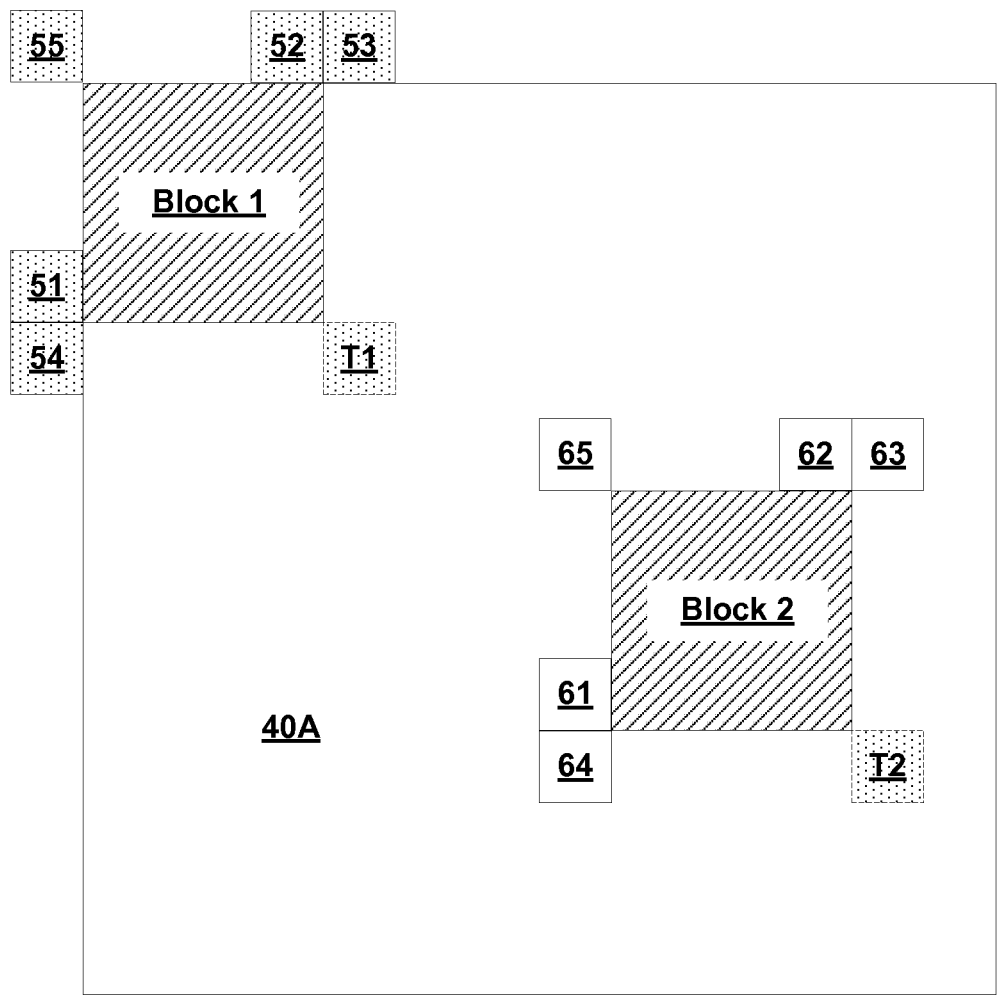
FIGS. 2A-2D are conceptual diagrams illustrating example video blocks within a parallel motion estimation (PME) region, as well as respective local spatial candidate blocks for the video blocks and a common set of candidate blocks outside of the PME region.

FIGS. 2A-2D are conceptual diagrams illustrating example video blocks within a parallel motion estimation (PME) region, as well as respective local spatial candidate blocks for the video blocks and a common set of candidate blocks outside of the PME region. For example, FIG. 2A shows an example of a PME region 40A, which may include a plurality of blocks of video data, e.g., PUs. Two of the video blocks (Block 1 and Block 2) are shown within PME region 40A, although other video blocks may also be present. When generating a list of motion information candidates, for merge mode or AMVP for example, motion information candidates may be selected based on local spatial candidates around a PU.

For Block 1, spatial candidate 51 (left neighbor), spatial candidate 52 (above neighbor), spatial candidate 53 (above-right neighbor), spatial candidate 54 (below-left neighbor), and spatial candidate 55 (above-left neighbor) represent example local spatial candidates around Block 1. For Block 2, spatial candidates 61, 62, 63, 64, and 65 represent examples of local spatial candidates.

Blocks T1 and T2 represent temporal candidates for Blocks 1 and 2, respectively. Blocks T1 and T2 are depicted as being within PME region 40A, adjacent to Block 1 and Block 2, in FIG. 2A. In some cases, Blocks T1 and T2 can be located in the center of, or otherwise inside of Blocks 1 and 2. In either case, Blocks T1 and T2 are shown with dashed borders to represent that they are, in fact, located in a different picture than Block 1 and Block 2. Blocks T1 and T2 may be located in the other picture at a location below and right of Block 1 and Block 2, respectively, as illustrated in FIG. 2A. In other examples, blocks T1 and T2 may be co-located relative to Block 1 and Block 2, respectively, i.e., may at least partially overlap the locations of Block 1 and Block 2, but in another picture.

As can be seen in FIG. 2A, Block 1 is located at both the upper and left boundaries of PME region 40A. Accordingly, local spatial candidate blocks 51, 52, 53, 54, and 55 are located outside PME region 500. Thus, according to the HEVC standard, local spatial candidate blocks 51, 52, 53, 54, and 55 are all available for evaluation by a video coder, e.g., video encoder 20 and/or video decoder 30, for construction of a motion information candidate list, e.g., for merge mode or AMVP mode.

Block 2, by contrast, is not located at a boundary of PME region 40A, and local spatial candidate blocks 61, 62, 63, 64, and 65 for Block 2 are located within PME region 40A. As the motion information of video blocks within PME region 40A is coded in parallel, local spatial candidate blocks 61, 62, 63, 64, and 65 are unavailable to a video coder when constructing a candidate list of motion information for Block 2, because the candidate blocks within the PME region are coded in parallel with Block 2 and, thus, have not yet themselves been coded. Thus, when a video coder constructs a motion information candidate list for Block 2, spatial candidates 61, 62, 63, 64, and 65 are unavailable for inclusion in the motion information candidate list and, according to the currently-proposed HEVC, are marked unavailable for motion information candidate list construction. Accordingly, in some cases, block T2 may be the only candidate block whose motion information is available for a video coder to include in a motion information candidate list for Block 2.

In this disclosure the ordinal numbering of spatial candidates may correspond to an order in which the spatial candidates are considered for inclusion in a motion information candidate list. This ordering, however, merely represents one example ordering, and other orderings are contemplated and are compatible with the techniques of this disclosure.

According to techniques of this disclosure, a video coder, e.g., video encoder 20 or video decoder 30, may identify a common set of spatial candidate blocks for all blocks within a PME region for which motion information prediction is performed, e.g., including for Block 1 and Block 2 of PME region 40A in FIG. 2A. According to the techniques of this disclosure, to construct the motion information candidate list for one or more of the video blocks in the PME region, the video coder may evaluate the motion information of one or more of the common set of candidate blocks.

Figure 2B:
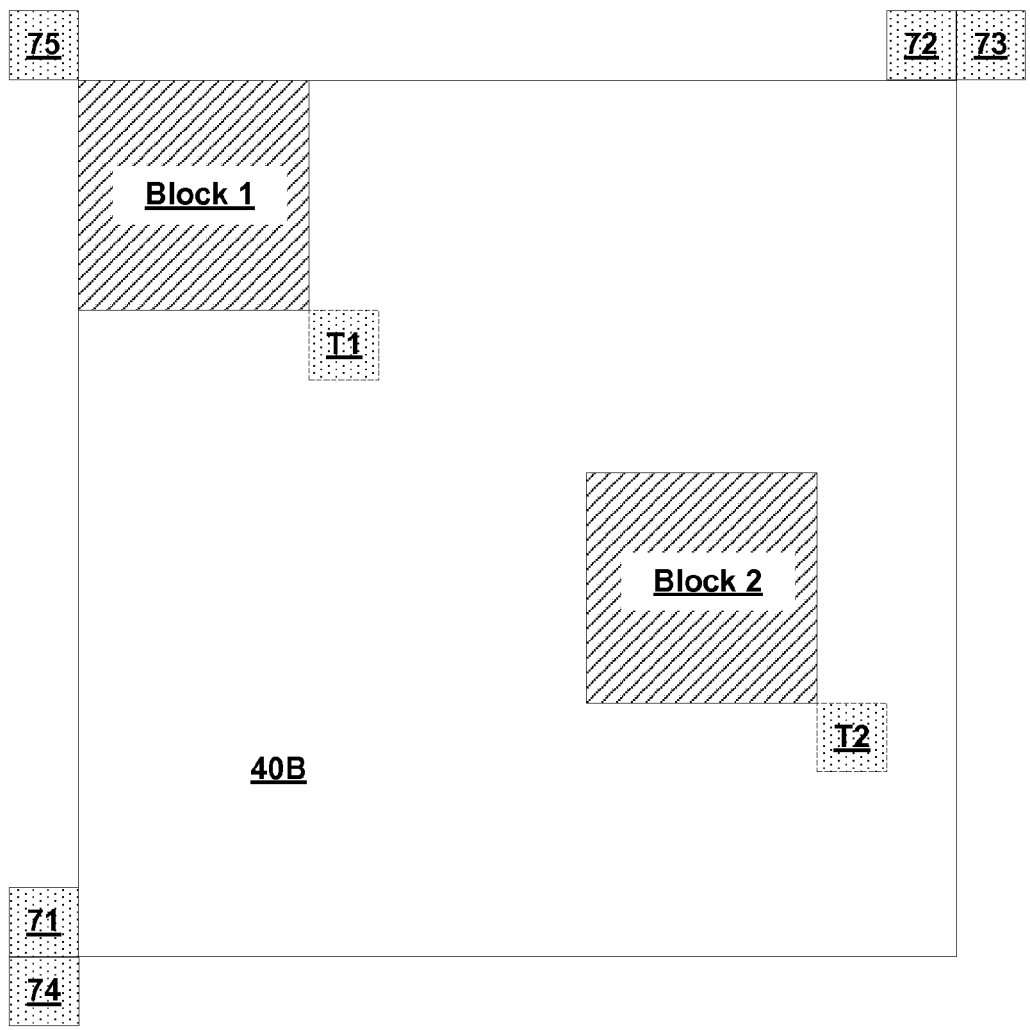

FIG. 2B is a conceptual diagram illustrating an example PME region 40B, which includes a plurality of video blocks, e.g., PUs, including Block 1 and Block 2. In the example illustrated by FIG. 2B. Block 1 and Block 2 are located within PME region 40B at substantially the same locations they were in PME region 40A of FIG. 2A. FIG. 2B also illustrates a common set of spatial candidate blocks 71, 72, 73, 74 and 75, which may be spatial candidates for all of the video blocks within PME region 40B, including Block 1 and Block 2.

As illustrated in FIG. 2B, a video coder selects these common spatial candidate blocks such that they are located outside of PME region 40B. Furthermore, the common spatial candidate blocks may be adjacent to PME region 40B. In some examples, as illustrated in FIG. 2B, the relationship of the locations of the set of common spatial candidate blocks to the PME region may be the same as that of the locations of local spatial candidate blocks to a video block. For example, as illustrated in FIG. 2B, common spatial candidate blocks 71, 72, 73, 74 and 75 have the same locations relative to PME region 40B as local spatial candidate blocks 61, 62, 63, 64 and 65 did relative to Block 2 in FIG. 2A. The location of the common spatial candidate blocks can be defined relative to the PME region as would be for local spatial candidates relative to a PU the size of the PME region with a 2N×2N partition mode, e.g., according to the merge mode or AMVP mode for HEVC. In the example illustrated in FIG. 2B, the common set of spatial candidate blocks include block 71 located left of PME region 40B, block 72 located above PME region 40B, block 73 located above-right of PME region 40B, block 74 located below-left of PME region 40B, and block 75 located above-left of PME region 40B. The locations and numbers of common spatial candidate blocks illustrated in FIG. 2B are one example for illustration purposes, and other common spatial candidate block locations outside of the current PME region can additionally or alternatively be used according to the techniques of this disclosure.

According to some example techniques of this disclosure, a video coder, e.g., video encoder 20 or video decoder 30, may evaluate the set of common spatial candidate blocks 71, 72, 73, 74, and 75 outside of the PME region 40B to construct a motion information candidate list for one or more of the video blocks within PME region 40B. In some examples, the video coder, e.g., video encoder 20 or video decoder 30, may, for each of the video blocks within the PME region 40B for which motion information prediction is performed, evaluate each of the set of common spatial candidate blocks 71, 72, 73, 74, and 75, and no local spatial candidate blocks. According to such examples, for Block 1, a video coder may evaluate common spatial candidate blocks 71, 72, 73, 74, and 75, as well as temporal candidate Block T1, but none of local spatial candidate blocks 51, 52, 53, 54 and 55. Similarly, for Block 2, a video coder may evaluate common spatial candidate blocks 71, 72, 73, 74, and 75, as well as temporal candidate Block T2, but none of local spatial candidate blocks 51, 52, 53, 54 and 55. Local spatial candidate blocks 51, 52, 53, 54, 55, 61, 62, 63, 64 and 65, which are not considered by a video coder when constructing motion information candidate lists for Blocks 1 and 2 according to such examples, are not shown in FIG. 2B for ease of illustration.

In some examples, when constructing a motion information candidate list for a video block within PME region 40B, a video coder may consider one or more temporal reference blocks from another picture, e.g., T1 and T2 in addition to the common set of spatial candidate blocks 71, 72, 73, 74 and 75. In other examples, the video coder may evaluate a common temporal candidate block for all of the video blocks within PME region 40B. The common temporal candidate block may be one of the temporal candidate blocks for one of the video blocks within PME region 40B. In some examples, the common temporal candidate block may be located in the other picture in a position that would be centrally-located, or at a lower-right location, within or adjacent PME region 40B in the current picture. Examples in which a video coder, e.g. video encoder 20 or video decoder 30, evaluates the common set of spatial candidate blocks 71, 72, 73, 74 and 75 instead of any local spatial candidate blocks may reduce the complexity of constructing motion information candidate lists to code the video blocks within PME region 40B. Examples in which the video coder additionally evaluates a common temporal candidate block for all of the video blocks within PME region 40B may further reduce the complexity of constructing motion information candidate lists for the video blocks. In such examples, all of the video blocks within PME region 40B for which motion information prediction is performed may have the same motion information candidate list, constructed by evaluation of the set of common spatial candidate blocks 71, 72, 73, 74 and 75, as well as the common temporal candidate block.

Figure 2C:
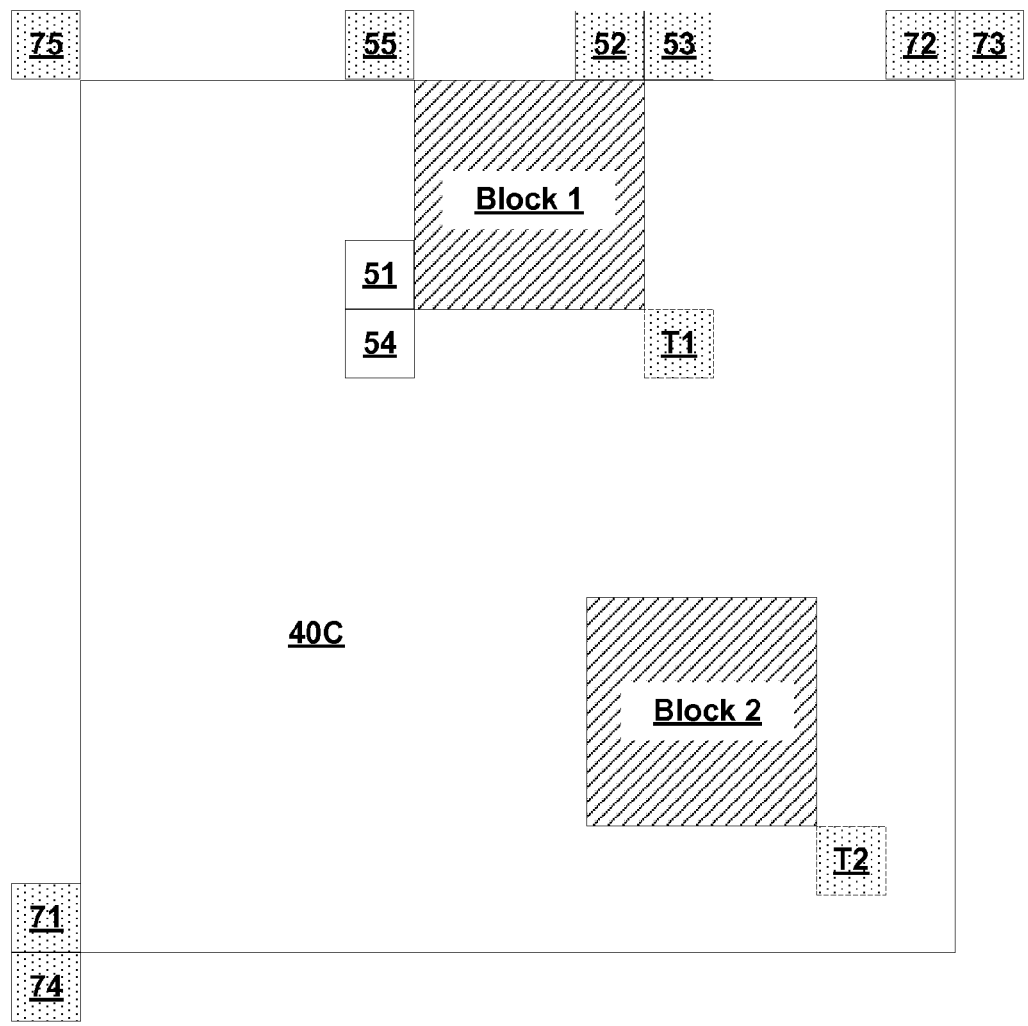

FIG. 2C is a conceptual diagram illustrating an example PME region 40C, which includes a plurality of video blocks, e.g., PUs, including Block 1 and Block 2. FIG. 2C also illustrates a common set of spatial candidate blocks 71, 72, 73, 74 and 75, which may be spatial candidates for all of the video blocks within PME region 40C, including Block 1 and Block 2. The set of common spatial candidate blocks 71, 72, 73, 74 and 75 are at the same locations relative to PME region 40C as they were for PME region 40B. The locations for the set of common spatial candidate blocks 71, 72, 73, 74 and 75 illustrated in FIGS. 2B-2D are merely examples, and other locations and numbers of common spatial candidate blocks may be used in accordance with the techniques of this disclosure.

In some examples, as illustrated by FIG. 2C, a video coder, e.g., video encoder 20 and/or video decoder 30, may, for constructing motion information candidate lists for the video blocks within PME region 40C, evaluate the set of common spatial candidate blocks 71, 72, 73, 74 and 75, in addition to any local spatial candidate blocks for the video block that are available and the temporal candidate block. A local spatial candidate block for a video block within the PME region 40C may be available when the local spatial candidate block is outside of the PME region 40C. Accordingly, to construct the motion information candidate list for Block 1, a video coder may evaluate local spatial candidate blocks 52, 53 and 55, in addition to the set of common spatial candidate blocks and the temporal candidate block. Local spatial candidate blocks 51 and 54 are within PME region 40C, and thus are unavailable for evaluation when constructing the motion information candidate list for Block 1. As another example, to construct the motion information candidate list for Block 2, a video coder may evaluate only the set of common spatial candidate blocks and the temporal candidate block. Local spatial candidate blocks 61, 62, 63, 64 and 65 (FIG. 2A) for Block 2 are within PME region 40C, and thus not available for constructing the motion information candidate list for Block 2.

In some examples, video encoder 20 or video decoder 30 may first evaluate the available local spatial candidate blocks (e.g., 52, 53, and 55 for Block 1) for inclusion in a motion information candidate list for Block 1. In such examples, if after evaluation of the local spatial candidate blocks available spots in the motion information candidate list remain, then the video coder may evaluate the set of common spatial candidate blocks (e.g., 71, 72, 73, 74 and 75). In some implementations, this order of evaluation may be reversed. Additionally, other candidates not explicitly discussed, such as temporal candidates and artificially generated candidates, may also be considered for inclusion in the motion information candidate lists for video blocks within PME region 40C. These other candidates may be considered either before or after the local spatial candidates are considered and may be considered either before or after the common spatial candidates are considered.

Figure 2D:
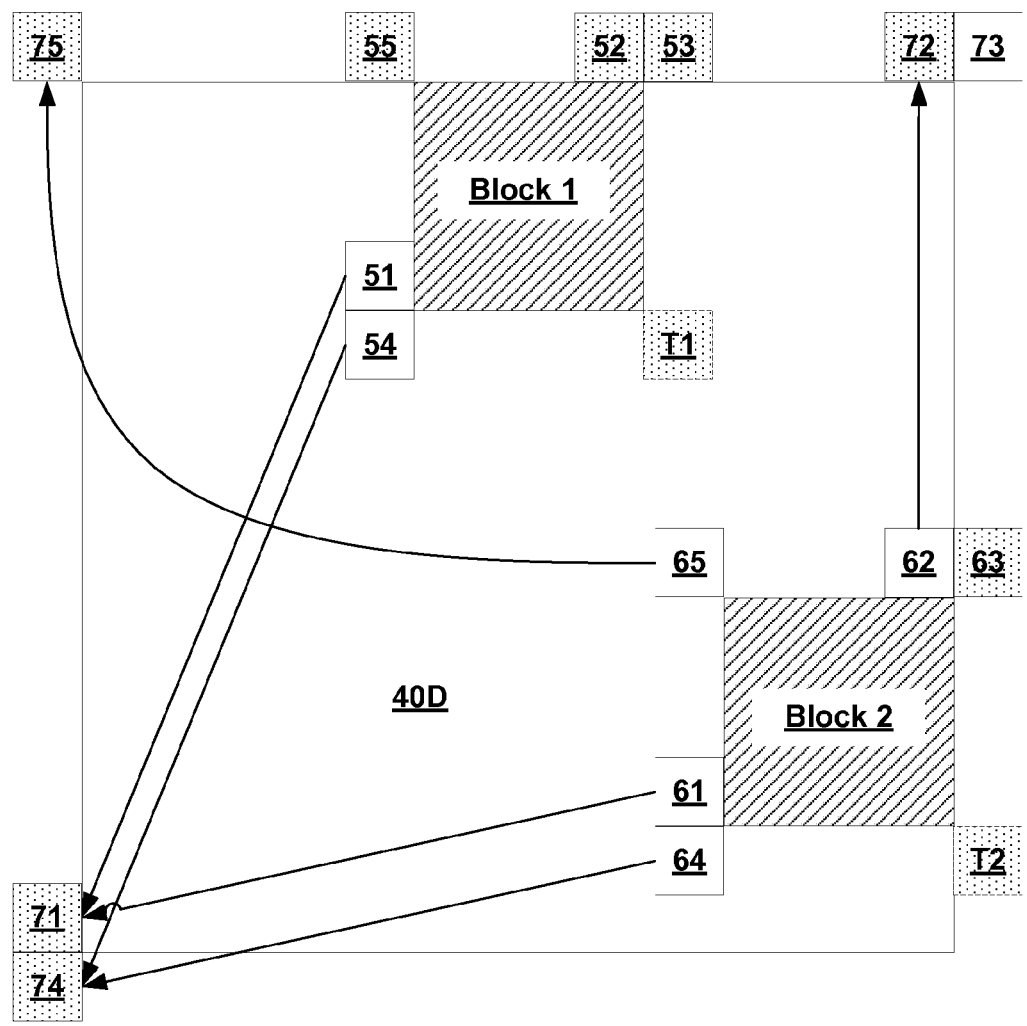

FIG. 2D is a conceptual diagram illustrating an example PME region 40D, which includes a plurality of video blocks, e.g., PUs, including Block 1 and Block 2. FIG. 2C also illustrates a common set of spatial candidate blocks 71, 72, 73, 74 and 75, which may be spatial candidates for all of the video blocks within PME region 40D, including Block 1 and Block 2. The set of common spatial candidate blocks 71, 72, 73, 74 and 75 are at the same locations relative to PME region 40D as they were for PME regions 40B and 40C (FIGS. 2B and 2C).

According to another example technique of this disclosure, as shown in FIG. 2D, for a given video block within PME region 40D, when one or more of the local spatial candidate blocks are not available for construction of the motion information candidate list because they are located inside the PME region, a video coder may use one or more of the set of common spatial candidate blocks with corresponding locations to replace those unavailable local spatial candidate blocks. More particularly, a video coder, e.g., video encoder 20 and/or video decoder 30, may identify one of the common set of spatial candidate blocks 71, 72, 73, 74 and 75 outside of PME region 40D whose location relative to PME region 40D is the same as a location of the unavailable local spatial candidate block relative to the video block within PME region 40D. The video coder may then evaluate the motion information of the identified one of the common set of spatial candidate blocks for inclusion in the motion information candidate list for the video block within PME region 40D.

As shown in FIG. 2D, for constructing the motion information candidate list for Block 1, a video coder may determine that local spatial candidate blocks 51 and 54 are unavailable due to being located within PME region 40D. The video coder may identify common spatial candidate block 71 as a replacement for local spatial candidate block 51, because common spatial candidate block 71 has the same location relative to PME region 40D as local spatial candidate block 51 has to Block 1. In particular, local spatial candidate block 51 is a left neighbor of Block 1, and common spatial candidate block 71 is a left neighbor of PME region 40D. The video coder may similarly identify common spatial candidate block 74 as a replacement for local spatial candidate block 54, because common spatial candidate block 74 has the same location relative to PME region 40D as local spatial candidate block 54 has to Block 1. In particular, local spatial candidate block 54 is a lower-left neighbor (below and left) of Block 1, and common spatial candidate block 74 is a lower-left neighbor (below and left) of PME region 40D.

As shown in FIG. 2D, for constructing the motion information candidate list for Block 2, a video coder may determine that local spatial candidate blocks 61, 62, 64 and 65 are unavailable due to being located within PME region 40D. The video coder may identify common spatial candidate block 71 as a replacement for local spatial candidate block 61, because common spatial candidate block 71 has the same location relative to PME region 40D as local spatial candidate block 61 has to Block 2. In particular, local spatial candidate block 61 is a left neighbor of Block 2, and common spatial candidate block 71 is a left neighbor of PME region 40D. The video coder may similarly identify common spatial candidate block 72 as a replacement for local spatial candidate block 62, because common spatial candidate block 72 has the same location relative to PME region 40D as local spatial candidate block 62 has to Block 2. In particular, local spatial candidate block 62 is an upper neighbor (above) of Block 2, and common spatial candidate block 72 is an upper neighbor (above) of PME region 40D. The video coder may similarly identify common spatial candidate block 74 as a replacement for local spatial candidate block 64, because common spatial candidate block 74 has the same location relative to PME region 40D as local spatial candidate block 64 has to Block 2. In particular, local spatial candidate block 64 is a lower-left neighbor (below and left) of Block 2, and common spatial candidate block 74 is a lower-left neighbor (below and left) of PME region 40D. Additionally, the video coder may identify common spatial candidate block 75 as a replacement for local spatial candidate block 65, because common spatial candidate block 75 has the same location relative to PME region 40D as local spatial candidate block 65 has to Block 2. In particular, local spatial candidate block 65 is an upper-left neighbor (above and left) of Block 2, and common spatial candidate block 75 is an upper-left neighbor (above and left) of PME region 40D.

In some examples, a video coder may, for generation of a motion information candidate list for a given video block, consider the local spatial candidate blocks of the given video block in a predetermined order, e.g., considering local spatial candidate blocks 51, 52, 53, 54 and 55 in numerical order for Block 1. In some examples, the video coder may consider the available local spatial candidate blocks, and the replacements for unavailable local spatial candidate blocks from the set of common spatial candidate blocks, in the order that the local spatial candidate blocks would have been considered were they all available. Thus, for example, when constructing a motion information candidate list for Block 1, a video coder may first evaluate common spatial candidate block 71 (replacing local spatial candidate block 51), followed by local spatial candidate block 52, followed by local spatial candidate block 53, followed by common spatial candidate block 74 (replacing local spatial candidate block 54), followed by local spatial candidate block 55. In other implementations, however, a video coder may consider all local spatial candidate blocks before the common spatial candidate blocks are considered, or may consider all common spatial candidate blocks before the local spatial candidate blocks are considered.

In the various examples described above, a temporal candidate for each video block within a PME region (e.g., Block 1 and Block 2) may be different. For example, when constructing motion information candidate lists for Block 1 and Block 2, respectively, the spatial candidate blocks (i.e., the common spatial candidate blocks) considered for inclusion in the list may be the same, but each of Block 1 and Block 2 may have a unique temporal candidate (e.g. T1 and T2 shown in FIGS. 2A-2D). In other examples, in addition to common spatial candidate blocks, a common temporal candidate block can also be shared among different video blocks inside a PME region. In some examples, only one motion information candidate list may be constructed for all video blocks, e.g., PUs, for which motion information prediction is performed within a PME region. Constructing one motion candidate list per PME region may, in some instances, reduce coding complexity.

According to another example, a video coder may include only a single motion information candidate in the motion information candidate lists for at least some of the video blocks within a PME region. For example, since all local spatial candidates are unavailable for inner video blocks, e.g., non-border video blocks, within the PME region, and essentially only temporal motion information candidates may exist for those video blocks, a video coder may evaluate only one motion information candidate, e.g., motion vector predictor (MVP) in the candidate list for those video blocks. As a result of having only one candidate in the motion information candidate list, the video encoder and video decoder may skip signaling an index, e.g., merge index, into motion information candidate list. This one single motion information candidate in such examples may be a temporal candidate, or zero motion vector with reference index 0, if the temporal candidate is not available.

Figure 3:
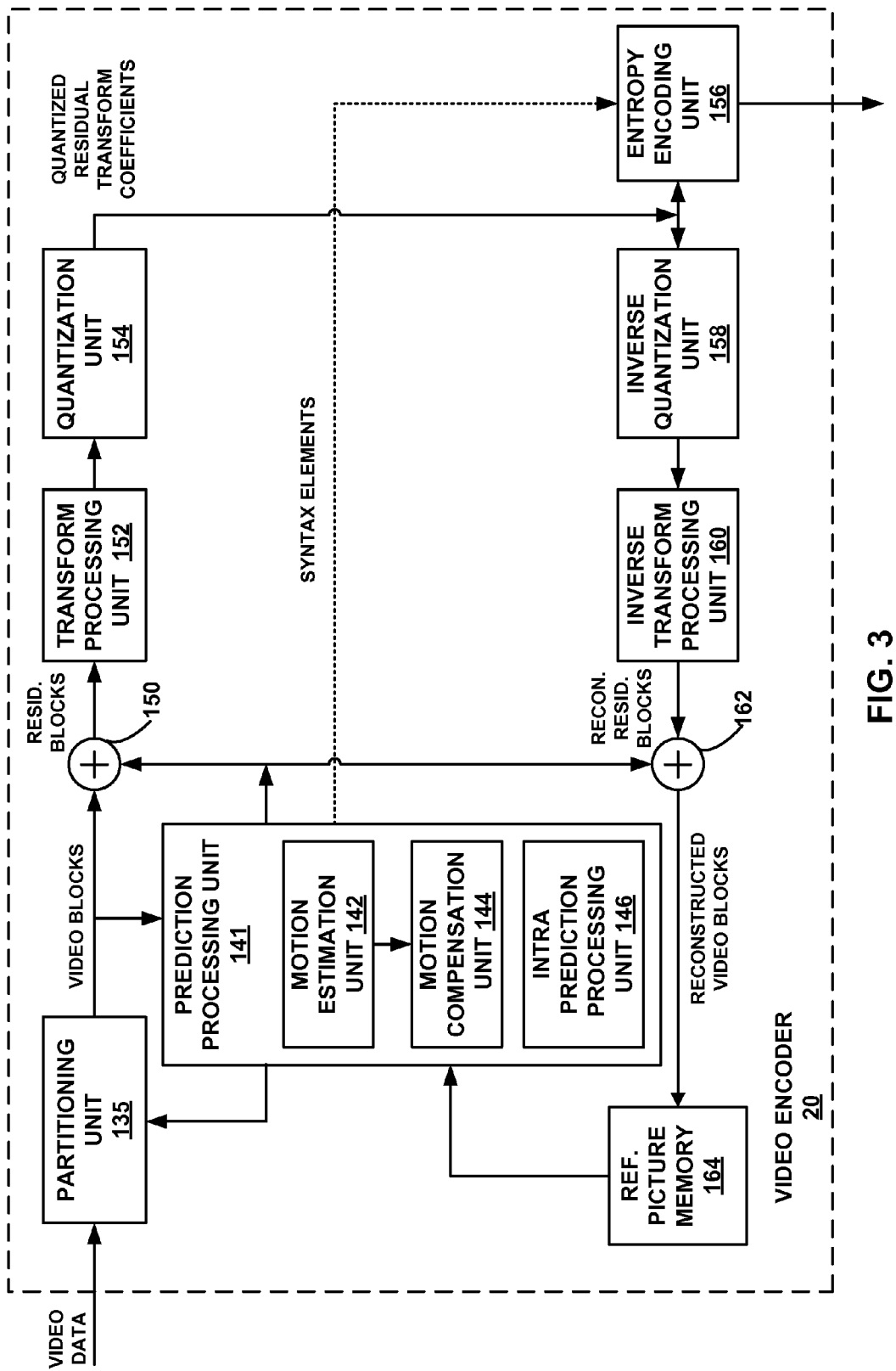
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 135, prediction processing unit 141, reference picture memory 164, summer 150, transform processing unit 152, quantization unit 154, and entropy encoding unit 156. Prediction processing unit 141 includes motion estimation unit 142, motion compensation unit 144, and intra prediction processing unit 146. For video block reconstruction, video encoder 20 also includes inverse quantization unit 158, inverse transform processing unit 160, and summer 162. A deblocking filter (not shown in FIG. 3) may also be included to filter block boundaries to remove blockiness artifacts from reconstructed video. If desired, the deblocking filter would typically filter the output of summer 162. Additional loop filters (in loop or post loop) may also be used in addition to the deblocking filter.

As shown in FIG. 3, video encoder 20 receives video data, and partitioning unit 135 partitions the data into video blocks. This partitioning may also include partitioning into slices, tiles, or other larger units, as wells as video block partitioning, e.g., according to a quadtree structure of LCUs and CUs. The example configuration of video encoder 20 illustrated in FIG. 3 generally illustrates the components that encode video blocks within a video slice to be encoded. The slice may be divided into multiple video blocks (and possibly into sets of video blocks referred to as tiles). Partitioning unit 135 may additionally control partitioning of a picture, e.g., grouping of adjacent video blocks, into PME regions for parallel processing by prediction processing unit 141 according to the techniques of this disclosure.

Prediction processing unit 141 may select one of a plurality of possible coding modes, such as one of a plurality of intra coding modes or one of a plurality of inter coding modes, for the current video block based on error results (e.g., coding rate and the level of distortion). Prediction processing unit 141 may provide the resulting intra- or inter-coded block to summer 150 to generate residual block data and to summer 162 to reconstruct the encoded block for use as a reference picture.

Intra prediction processing unit 146 within prediction processing unit 141 may perform intra-predictive coding of the current video block relative to one or more neighboring blocks in the same frame or slice as the current block to be coded to provide spatial compression. Motion estimation unit 142 and motion compensation unit 144 within prediction processing unit 141 perform inter-predictive coding of the current video block relative to one or more predictive blocks in one or more reference pictures to provide temporal compression.

Motion estimation unit 142 may be configured to determine the inter-prediction mode for a video slice according to a predetermined pattern for a video sequence. The predetermined pattern may designate video slices in the sequence as P slices, B slices or GPB slices. Motion estimation unit 142 and motion compensation unit e 144 may be highly integrated, but are illustrated separately for conceptual purposes. Motion estimation, performed by motion estimation unit 142, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 164. For example, video encoder 20 may interpolate values of one-quarter pixel positions, one-eighth pixel positions, or other fractional pixel positions of the reference picture. Therefore, motion estimation unit 142 may perform a motion search relative to the full pixel positions and fractional pixel positions and output a motion vector with fractional pixel precision.

Motion estimation unit 142 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 164. Motion estimation unit 142 sends the calculated motion vector to entropy encoding unit 156 and motion compensation unit 144.

Motion compensation, performed by motion compensation unit 144, may involve fetching or generating the predictive block based on the motion vector determined by motion estimation, possibly performing interpolations to sub-pixel precision. Upon receiving the motion vector for the PU of the current video block, motion compensation unit 144 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 150 represents the component or components that perform this subtraction operation. Motion compensation unit 144 may also generate syntax elements associated with the video blocks and the video slice for use by video decoder 30 in decoding the video blocks of the video slice.

Intra-prediction processing unit 146 may intra-predict a current block, as an alternative to the inter-prediction performed by motion estimation unit 142 and motion compensation unit 144, as described above. In particular, intra-prediction processing unit 146 may determine an intra-prediction mode to use to encode a current block. In some examples, intra-prediction processing unit 146 may encode a current block using various intra-prediction modes, e.g., during separate encoding passes, and intra-prediction processing unit 146 (or a mode select unit (not shown), in some examples) may select an appropriate intra-prediction mode to use from the tested modes. For example, intra-prediction processing unit 146 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 146 may calculate ratios from the distortions and rates for the various encoded blocks to determine which intra-prediction mode exhibits the best rate-distortion value for the block.

In any case, after selecting an intra-prediction mode for a block, intra-prediction processing unit 146 may provide information indicative of the selected intra-prediction mode for the block to entropy encoding unit 156. Entropy encoding unit 156 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 141 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 152. Transform processing unit 152 transforms the residual video data into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization unit 154. Quantization unit 154 quantizes the transform coefficients to further reduce bit rate. The quantization process may reduce the bit depth associated with some or all of the coefficients. The degree of quantization may be modified by adjusting a quantization parameter. In some examples, quantization unit 154 may then perform a scan of the matrix including the quantized transform coefficients. Alternatively, entropy encoding unit 156 may perform the scan.

Following quantization, entropy encoding unit 156 entropy encodes the quantized transform coefficients. For example, entropy encoding unit 156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors, other motion information, and the other syntax elements for the current video slice being coded.

Inverse quantization unit 158 and inverse transform processing unit 160 apply inverse quantization and inverse transformation, respectively, to reconstruct the residual block in the pixel domain for later use as a reference block of a reference picture. Motion compensation unit 144 may calculate a reference block by adding the residual block to a predictive block of one of the reference pictures within one of the reference picture lists. Motion compensation unit 144 may also apply one or more interpolation filters to the reconstructed residual block to calculate sub-integer pixel values for use in motion estimation. Summer 162 adds the reconstructed residual block to the motion compensated prediction block produced by motion compensation unit 144 to produce a reference block for storage in reference picture memory 164. The reference block may be used by motion estimation unit 142 and motion compensation unit 144 as a reference block to inter-predict a block in a subsequent video frame or picture.

According to the techniques of this disclosure, motion estimation, e.g., as performed by motion estimation unit 142, may be performed in parallel for a plurality of video blocks in a PME region. Partitioning unit 135 may define the PME region to include a plurality of adjacent blocks within a picture for which motion estimation is to be performed by motion estimation unit 142 in parallel. In order to facilitate such parallelization, a video encoder 20 may include a plurality of parallel processing units, which may be separate hardware and/or software units, each of which may implement a motion estimation unit 142 to perform motion estimation for a respective video block in the manner described herein. The plurality of motion estimation unit 142 may process a plurality of blocks concurrently, e.g., at the same time or at overlapping times.

In this manner, video encoder 20 of FIG. 3 represents an example of a video encoder configured, according to the techniques of this disclosure to, for a PME region comprising a plurality of blocks of video data within the PME region, identify a common set of spatial candidate blocks outside of and adjacent the PME region, each of the common set of spatial candidate blocks at a respective, predefined location relative to the PME region and, for each of the blocks within the PME region for which motion information prediction is performed, generate a respective motion information candidate list, wherein, for at least some of the blocks within the PME region for which motion information prediction is performed, to generate the motion information candidate list the video coder is configured to evaluate motion information of at least one of the common set of spatial candidate blocks for inclusion in the motion information candidate list for the block. Video encoder 20 is further configured, according to the techniques of this disclosure, to encode the blocks of video data within the PME region for which motion information prediction is performed based on the respective motion information candidate lists.

Figure 4:
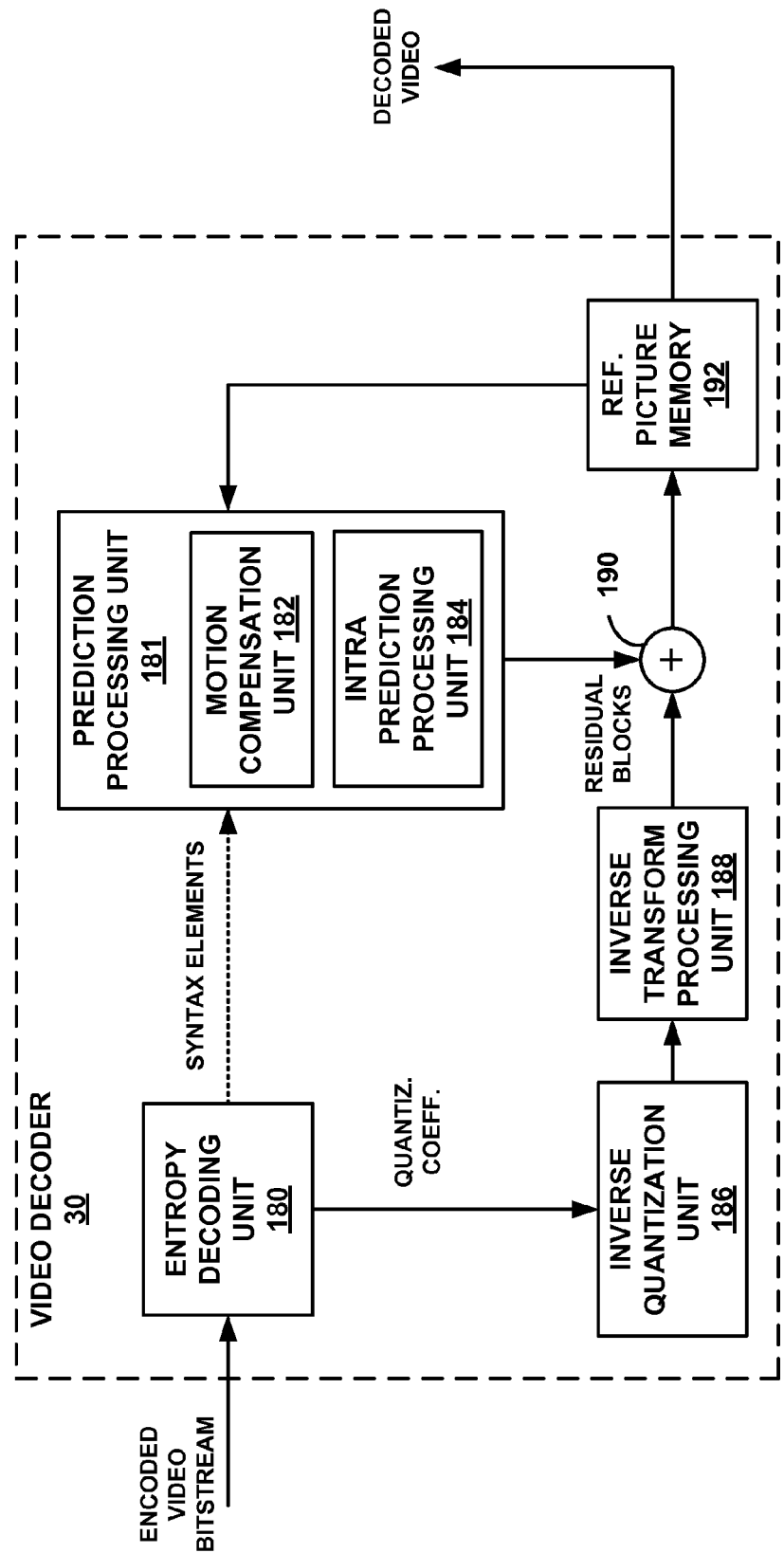
FIG. 4 is a block diagram illustrating an example video decoder that may implement the techniques described in this disclosure.

FIG. 4 is a block diagram illustrating an example video decoder 30 that may implement the techniques described in this disclosure. In the example of FIG. 4, video decoder 30 includes an entropy decoding unit 180, prediction processing unit 181, inverse quantization unit 186, inverse transformation processing unit 188, summer 190, and reference picture memory 192. Prediction processing unit 181 includes motion compensation unit 182 and intra prediction processing unit 184. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Entropy decoding unit 180 of video decoder 30 entropy decodes the bitstream to generate quantized coefficients, motion vectors, other motion information, and other syntax elements. Entropy decoding unit 180 forwards the motion information and other syntax elements to prediction processing unit 181. Video decoder 30 may receive the syntax elements at the video slice level and/or the video block level, as examples.

When the video slice is coded as an intra-coded (I) slice, intra prediction processing unit 184 of prediction processing unit 181 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 182 of prediction processing unit 181 produces predictive blocks for a video block of the current video slice based on the motion vectors and other syntax elements received from entropy decoding unit 180. The predictive blocks may be produced from one of the reference pictures within one of the reference picture lists. Video decoder 30 may construct the reference frame lists, List 0 and List 1, using default construction techniques based on reference pictures stored in reference picture memory 192.

Motion compensation unit 182 determines prediction information for a video block of the current video slice by parsing the motion vectors and other syntax elements, and uses the prediction information to produce the predictive blocks for the current video block being decoded. For example, motion compensation unit 182 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 182 may also perform interpolation based on interpolation filters. Motion compensation unit 182 may use interpolation filters as used by video encoder 20 during encoding of the video blocks to calculate interpolated values for sub-integer pixels of reference blocks. In this case, motion compensation unit 182 may determine the interpolation filters used by video encoder 20 from the received syntax elements and use the interpolation filters to produce predictive blocks.

Inverse quantization unit 186 inverse quantizes, i.e., de-quantizes, the quantized transform coefficients provided in the bitstream and decoded by entropy decoding unit 180. The inverse quantization process may include use of a quantization parameter calculated by video encoder 20 for each video block in the video slice to determine a degree of quantization and, likewise, a degree of inverse quantization that should be applied. Inverse transform processing unit 188 applies an inverse transform, e.g., an inverse DCT, an inverse integer transform, or a conceptually similar inverse transform process, to the transform coefficients in order to produce residual blocks in the pixel domain.

After motion compensation unit 182 generates the predictive block for the current video block based on the motion vectors and other syntax elements, video decoder 30 forms a decoded video block by summing the residual blocks from inverse transform processing unit 188 with the corresponding predictive blocks generated by motion compensation unit 182. Summer 190 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 192, which stores reference pictures used for subsequent motion compensation. Reference picture memory 192 also stores decoded video for later presentation on a display device, such as display device 32 of FIG. 1.

According to the techniques of this disclosure, motion estimation, which may be performed in video decoder 30 by prediction processing unit 181 and/or motion compensation unit 182 as part of the motion compensation process, may be performed in parallel for a plurality of video blocks in a PME region. Prediction processing unit 181 and/or motion compensation unit 182 may identify a PME region that includes a plurality of adjacent video blocks within a picture for which motion estimation is to be performed in parallel, e.g., based on syntax elements received from video encoder 20 and decoded by entropy decoding unit 180. In order to facilitate such parallelization, a video decoder 30 may include a plurality of parallel processing units, which may be separate hardware and/or software units, each of which may implement a prediction processing unit 181 and/or motion compensation unit 182 that performs motion estimation for a respective video block in the manner described herein. The plurality of prediction processing units 181 and/or motion compensation units 182 may process a plurality of blocks concurrently, e.g., at the same time or at overlapping times.

In this manner, video decoder 30 of FIG. 4 represents an example of a video decoder configured, according to the techniques of this disclosure to, for a PME region comprising a plurality of blocks of video data within the PME region, identify a common set of spatial candidate blocks outside of and adjacent the PME region, each of the common set of spatial candidate blocks at a respective, predefined location relative to the PME region and, for each of the blocks within the PME region for which motion information prediction is performed, generate a respective motion information candidate list, wherein, for at least some of the blocks within the PME region for which motion information prediction is performed, to generate the motion information candidate list the video coder is configured to evaluate motion information of at least one of the common set of spatial candidate blocks for inclusion in the motion information candidate list for the block. Video decoder 20 is further configured, according to the techniques of this disclosure, to decode the blocks of video data within the PME region for which motion information prediction is performed based on the respective motion information candidate lists.

Figure 5:
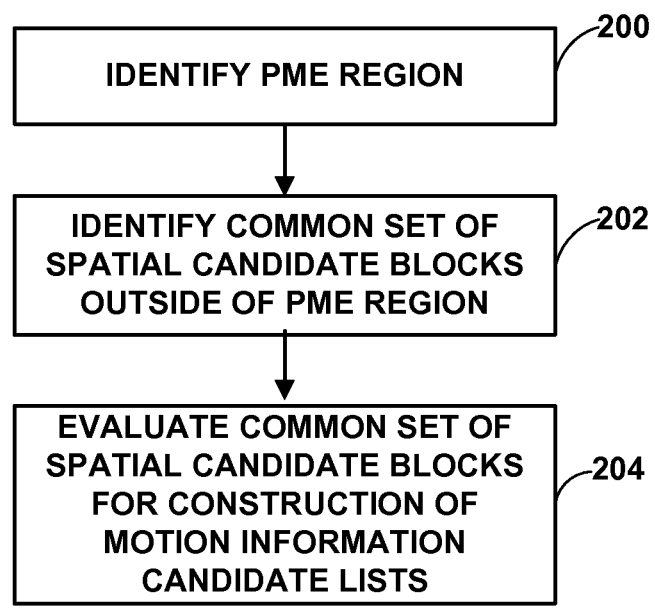
FIG. 5 is a flow diagram illustrating an example method for generating motion information candidate lists for video blocks within a PME region using a common set of spatial candidate blocks outside of the PME region.

FIG. 5 is a flow diagram illustrating an example method for generating motion information candidate lists for video blocks within a PME region using a common set of spatial candidate blocks outside of the PME region. According to the example method of FIG. 5, a video coder, e.g., video encoder 20 or video decoder 30, identifies a PME region (e.g., PME regions 40A-40D of FIGS. 2A-2D) (200). The video coder further identifies a set of common spatial candidate blocks for the PME region, which are outside of and adjacent to the PME region (202).

As discussed above, the relationship of the locations of the set of common spatial candidate blocks to the PME region may be the same as that of the locations of local spatial candidate blocks to a video block. In some examples, the location of the common spatial candidate blocks can be defined relative to the PME region as would be for local spatial candidates relative to a PU the size of the PME region with a 2N×2N partition mode, e.g., according to the merge mode or AMVP mode for HEVC. In some examples, the set of common spatial candidate blocks include one or more of a first block located to the left of the PME region, a second block located above the PME region, a third block located above and to the right of the PME region, and fourth block located below and to the left of the PME region, and a fifth block located above and to the left of the PME region.

According to the example of FIG. 5, the video coder may further evaluate the set of common spatial candidate blocks outside of the PME region for construction of motion information candidate lists for video blocks within the PME region (204). In some examples, e.g., as discussed above with reference to FIG. 2B, the video encoder and video decoder may evaluate all of the common set of spatial candidate blocks, and no local spatial candidate blocks, for each video block within the PME region for which motion information prediction is performed. In such examples, the video coder may additionally evaluate a respective temporal motion information candidate for each of the video blocks within the PME region for which motion information prediction is performed, or may evaluate a common temporal motion information candidate for all of the blocks for which motion information prediction is performed. In the latter case, the motion information candidate list may be the same for all of the video blocks within the PME region for which motion information prediction is performed. In other examples, e.g., as discussed above with reference to FIG. 2C, video encoder 20 and/or video decoder 30 may, for each video block in the PME region for which motion information prediction is performed, evaluate the motion information of all of the common set of spatial candidate blocks in addition to any local spatial candidate blocks that are outside of the PME region. In such examples, the video coder may evaluate local spatial candidate blocks before common spatial candidate blocks, evaluate common spatial candidate blocks before local spatial candidate blocks, or evaluate local and common spatial candidate blocks in any order.

Figure 6:
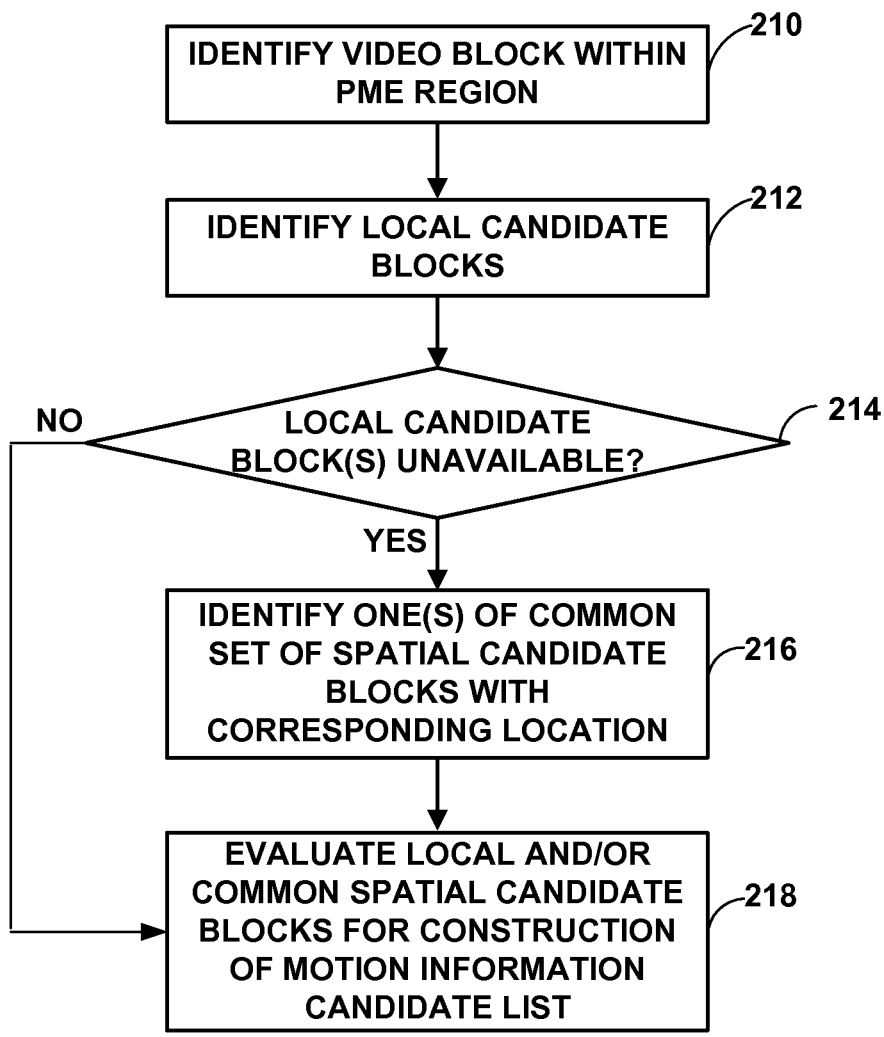
FIG. 6 is a flow diagram illustrating another example method for generating motion information candidate lists for video blocks within a PME region using a common set of spatial candidate blocks outside of the PME region.

FIG. 6 is a flow diagram illustrating another example method for generating motion information candidate lists for video blocks within a PME region using a common set of spatial candidate blocks outside of the PME region. According to the example method of FIG. 6, a video coder, e.g., video encoder 20 or video decoder 30, identifies a video block within a PME region (210). The video coder further identifies the local spatial candidate blocks for the video block (212).

The video coder determines whether any of the local spatial candidate blocks for the video block are unavailable, e.g., are located within the PME region (214). If all local spatial candidate blocks are available (NO of 214), the video coder evaluates the motion information of the local spatial candidate blocks for inclusion in a motion information candidate list for the video block, e.g., according to a merge or AMVP mode (218). However, if one or more local spatial candidate blocks are unavailable (YES of 214), the video coder identifies ones of the set of common spatial candidate blocks with a whose location relative to the PME region is the same as the location of the unavailable local spatial candidate blocks to the video block being coded, e.g., as described above with respect to FIG. 2D (216). The video coder may then evaluate the motion information of the available local spatial candidate blocks, and of the common spatial candidate blocks that replace unavailable local spatial candidate blocks (218). In some examples, as discussed above, the video coder may consider the available local spatial candidate blocks, and the replacements for unavailable local spatial candidate blocks from the set of common spatial candidate blocks, in the order that the local spatial candidate blocks would have been considered were they all available. In other implementations, however, a video coder may consider all local spatial candidate blocks before the common spatial candidate blocks are considered, or may consider all common spatial candidate blocks before the local spatial candidate blocks are considered.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:

identifying a common set of spatial candidate blocks outside of and adjacent to a parallel motion estimation (PME) region comprising a plurality of blocks of video data, each spatial candidate block of the common set of spatial candidate blocks at a respective, predefined location relative to the PME region, wherein the common set of spatial candidate blocks is common to the plurality of blocks of video data of the PME region, and wherein each of the plurality of blocks of video data within the PME region is associated with a respective plurality of local spatial candidate blocks that neighbor the block of video data;

generating a respective motion information candidate list for each of the blocks of video data within the PME region for which motion information prediction is performed, wherein, for each of the blocks of video data within the PME region for which motion information prediction is performed, generating the motion information candidate list comprises:

evaluating motion information of any of the plurality of local spatial candidate blocks associated with the block of video data that are outside of the PME region for inclusion in the motion information candidate list for the block of video data, and if, after evaluation of the local spatial candidate blocks, available spots in the motion information candidate list remain, evaluating motion information of each spatial candidate block of the common set of spatial candidate blocks for inclusion in the motion information candidate list for the block of video data; and decoding the blocks of video data within the PME region for which motion information prediction is performed based on the respective motion information candidate lists.

2. The method of claim 1, wherein a relationship of the locations of the spatial candidate blocks of the common set of spatial candidate blocks to the PME region is the same as a relationship of locations of the respective plurality of local spatial candidate blocks to each of the blocks of video data within the PME region.

3. The method of claim 1, wherein the predetermined locations of the spatial candidate blocks of the common set of spatial candidate blocks relative to the PME region comprise a first location left of the PME region, a second location above the PME region, a third location above-right of the PME region, a fourth location below-left of the PME region, and a fifth location above-left of the PME region.

4. The method of claim 1, further comprising, for each of the blocks of video data within the PME region for which motion information prediction is performed, evaluating a respective temporal motion information candidate for inclusion in the motion information candidate list for the block.

5. The method of claim 1, further comprising, for each of the blocks of video data within the PME region for which motion information prediction is performed, evaluating a common temporal motion information candidate for inclusion in the motion information candidate list for the block.

6. The method of claim 1, wherein the motion information candidates comprise at least one of motion vectors or reference indices.

7. The method of claim 1, wherein motion information candidate lists comprise motion information candidate lists for at least one of a merge mode or an advanced motion vector prediction (AMVP) mode.

8. A method for encoding video data, the method comprising:

identifying a common set of spatial candidate blocks outside of and adjacent to a parallel motion estimation (PME) region comprising a plurality of blocks of video data, each spatial candidate block of the common set of spatial candidate blocks at a respective, predefined location relative to the PME region, wherein the common set of spatial candidate blocks is common to the plurality of blocks of video data of the PME region, and wherein each of the plurality of blocks of video data within the PME region is associated with a respective plurality of local spatial candidate blocks that neighbor the block of video data;

generating a respective motion information candidate list for each of the blocks of video data within the PME region for which motion information prediction is performed, wherein, for each of the blocks of video data within the PME region for which motion information prediction is performed, generating the motion information candidate list comprises:

evaluating motion information of any of the plurality of local spatial candidate blocks associated with the block of video data that are outside of the PME region for inclusion in the motion information candidate list for the block of video data, and if, after evaluation of the local spatial candidate blocks, available spots in the motion information candidate list remain, evaluating motion information of each spatial candidate block of the common set of spatial candidate blocks for inclusion in the motion information candidate list for the block of video data; and encoding the blocks of video data within the PME region for which motion information prediction is performed based on the respective motion information candidate lists.

9. The method of claim 7, wherein a relationship of the locations of the spatial candidate blocks of the common set of spatial candidate blocks to the PME region is the same as a relationship of locations of the respective plurality of local spatial candidate blocks to each of the blocks of video data within the PME region.

10. The method of claim 7, wherein the predetermined locations of the spatial candidate blocks of the common set of spatial candidate blocks relative to the PME region comprise a first location left of the PME region, a second location above the PME region, a third location above-right of the PME region, a fourth location below-left of the PME region, and a fifth location above-left of the PME region.

11. The method of claim 7, further comprising, for each of the blocks of video data within the PME region for which motion information prediction is performed, evaluating a respective temporal motion information candidate for inclusion in the motion information candidate list for the block.

12. The method of claim 7, further comprising, for each of the blocks of video data within the PME region for which motion information prediction is performed, evaluating a common temporal motion information candidate for inclusion in the motion information candidate list for the block.

13. The method of claim 7, wherein the motion information candidates comprise at least one of motion vectors or reference indices.

14. The method of claim 7, wherein motion information candidate lists comprise motion information candidate lists for at least one of a merge mode or an advanced motion vector prediction (AMVP) mode.

15. An apparatus for coding video data, the apparatus comprising:

a memory configured to store the video data; and
a video coder configured to:

identify a common set of spatial candidate blocks outside of and adjacent to a parallel motion estimation (PME) region comprising a plurality of blocks of the video data, each spatial candidate block of the common set of spatial candidate blocks at a respective, predefined location relative to the PME region, wherein the common set of spatial candidate blocks is common to the plurality of blocks of the video data of the PME region, and wherein each of the plurality of blocks of the video data within the PME region is associated with a respective plurality of local spatial candidate blocks that neighbor the block of the video data;

generate a respective motion information candidate list for each of the blocks of the video data within the PME region for which motion information prediction is performed, wherein, for each of the blocks of the video data within the PME region for which motion information prediction is performed, to generate the motion information candidate list for the block of the video data the video coder:

evaluates motion information of any of the plurality of local spatial candidate blocks associated with the block of the video data that are outside of the PME region for inclusion in the motion information candidate list for the block of the video data, and if, after evaluation of the local spatial candidate blocks, available spots in the motion information candidate list remain, evaluates motion information of each spatial candidate block of the common set of spatial candidate blocks for inclusion in the motion information candidate list for the block of the video data; and code the blocks of the video data within the PME region for which motion information prediction is performed based on the respective motion information candidate lists.

16. The apparatus of claim 15, wherein a relationship of the locations of the spatial candidate blocks of the common set of spatial candidate blocks to the PME region is the same as a relationship of locations of the respective plurality of local spatial candidate blocks to each of the blocks of the video data within the PME region.

17. The apparatus of claim 15, wherein the predetermined locations of the spatial candidate blocks of the common set of spatial candidate blocks relative to the PME region comprise a first location left of the PME region, a second location above the PME region, a third location above-right of the PME region, a fourth location below-left of the PME region, and a fifth location above-left of the PME region.

18. The apparatus of claim 15, wherein the video coder is further configured to, for each of the blocks of the video data within the PME region for which motion information prediction is performed, evaluate a respective temporal motion information candidate for inclusion in the motion information candidate list for the block.

19. The apparatus of claim 15, wherein the video coder is further configured to, for each of the blocks of the video data within the PME region for which motion information prediction is performed, evaluate a common temporal motion information candidate for inclusion in the motion information candidate list for the block.

20. The apparatus of claim 15, wherein the motion information candidates comprise at least one of motion vectors or reference indices.

21. The apparatus of claim 15, wherein motion information candidate lists comprise motion information candidate lists for at least one of a merge mode or an advanced motion vector prediction (AMVP) mode.

22. The apparatus of claim 15, wherein the video coder comprises a video encoder configured to identify the common set of spatial candidate blocks, generate the respective motion information candidate list, evaluate the motion information, and encode the blocks of the video data.

23. The apparatus of claim 15, wherein the video coder comprises a video decoder configured to identify the common set of spatial candidate blocks, generate the respective motion information candidate list, evaluate the motion information, and decode the blocks of the video data.

24. The apparatus of claim 15, wherein the apparatus comprises at least one of:
an integrated circuit;
a microprocessor; or
a wireless communication device that includes the video coder.

25. An apparatus for coding video data, the apparatus comprising:

means for identifying a common set of spatial candidate blocks outside of and adjacent to a parallel motion estimation (PME) region comprising a plurality of blocks of video data, each spatial candidate block of the common set of spatial candidate blocks at a respective, predefined location relative to the PME region, wherein the common set of spatial candidate blocks is common to the plurality of blocks of video data of the PME region, and wherein each of the plurality of blocks of video data within the PME region is associated with a respective plurality of local spatial candidate blocks that neighbor the block of video data;

means for generating a respective motion information candidate list for each of the blocks of video data within the PME region for which motion information prediction is performed, wherein, means for generating the motion information candidate list comprises, for each of the blocks of video data within the PME region for which motion information prediction is performed:

means for evaluating motion information of any of the plurality of local spatial candidate blocks associated with the block of video data that are outside of the PME region for inclusion in the motion information candidate list for the block of video data, and if, after evaluation of the local spatial candidate blocks, available spots in the motion information candidate list remain, means for evaluating motion information of each spatial candidate block of the common set of spatial candidate blocks for inclusion in the motion information candidate list for the block of video data; and means for coding the blocks of video data within the PME region for which motion information prediction is performed based on the respective motion information candidate lists.

26. The apparatus of claim 25, wherein a relationship of the locations of the spatial candidate blocks of the common set of spatial candidate blocks to the PME region is the same as a relationship of locations of the respective plurality of local spatial candidate blocks to each of the blocks of video data within the PME region.

27. The apparatus of claim 25, wherein the predetermined locations of the spatial candidate blocks of the common set of spatial candidate blocks relative to the PME region comprise a first location left of the PME region, a second location above the PME region, a third location above-right of the PME region, a fourth location below-left of the PME region, and a fifth location above-left of the PME region.

28. The apparatus of claim 25, further comprising means for, for each of the blocks of video data within the PME region for which motion information prediction is performed, evaluating a respective temporal motion information candidate for inclusion in the motion information candidate list for the block.

29. The apparatus of claim 25, further comprising means for, for each of the blocks of video data within the PME region for which motion information prediction is performed, evaluating a common temporal motion information candidate for inclusion in the motion information candidate list for the block.

30. A non-transitory computer-readable storage medium having stored thereon instructions that, when executed, cause one or more processors of an apparatus for coding video data to:
  identify a common set of spatial candidate blocks outside of and adjacent to a parallel motion estimation (PME) region comprising a plurality of blocks of video data, each spatial candidate block of the common set of spatial candidate blocks at a respective, predefined location relative to the PME region, wherein the common set of spatial candidate blocks is common to the plurality of blocks of video data of the PME region, and wherein each of the plurality of blocks of video data within the PME region is associated with a respective plurality of local spatial candidate blocks that neighbor the block of video data;
  generate a respective motion information candidate list for each of the blocks of video data within the PME region for which motion information prediction is performed, wherein, for each of the blocks of video data within the PME region for which motion information prediction is performed, the instructions that cause the one or more processors to generate the motion information candidate list comprise instructions that cause the one or more processors to:
    evaluate motion information of any of the plurality of local spatial candidate blocks associated with the block of video data that are outside of the PME region for inclusion in the motion information candidate list for the block of video data, and
    if, after evaluation of the local spatial candidate blocks, available spots in the motion information candidate list remain, evaluate motion information of each spatial candidate block of the common set of spatial candidate blocks for inclusion in the motion information candidate list for the block of video data; and
  code the blocks of video data within the PME region for which motion information prediction is performed based on the respective motion information candidate lists.

31. The non-transitory computer-readable storage medium of claim 30, wherein a relationship of the locations of the spatial candidate blocks of the common set of spatial candidate blocks to the PME region is the same as a relationship of locations of the respective plurality of local spatial candidate blocks to each of the blocks of video data within the PME region.

32. The non-transitory computer-readable storage medium of claim 30, wherein the predetermined locations of the spatial candidate blocks of the common set of spatial candidate blocks relative to the PME region comprise a first location left of the PME region, a second location above the PME region, a third location above-right of the PME region, a fourth location below and left of the PME region, and a fifth location above and left of the PME region.

33. The non-transitory computer-readable storage medium of claim 30, further comprising instructions that cause the one or more processors to, for each of the blocks of video data within the PME region for which motion information prediction is performed, evaluate a respective temporal motion information candidate for inclusion in the motion information candidate list for the block.

34. The non-transitory computer-readable storage medium of claim 30, further comprising instructions that cause the one or more processors to, for each of the blocks of video data within the PME region for which motion information prediction is performed, evaluate a common temporal motion information candidate for inclusion in the motion information candidate list for the block.

* * * * *